May 8, 1951            J. W. DICKEY            2,552,480
ELECTRICAL HEATING SYSTEM
Filed Oct. 29, 1945            2 Sheets—Sheet 1
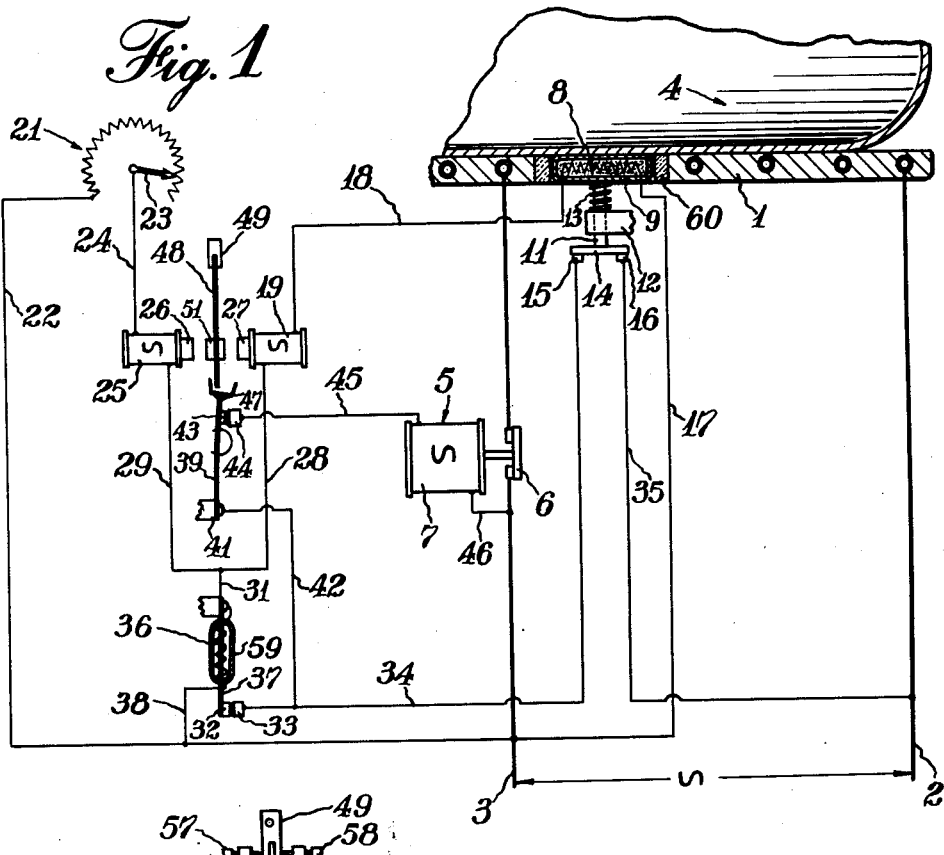
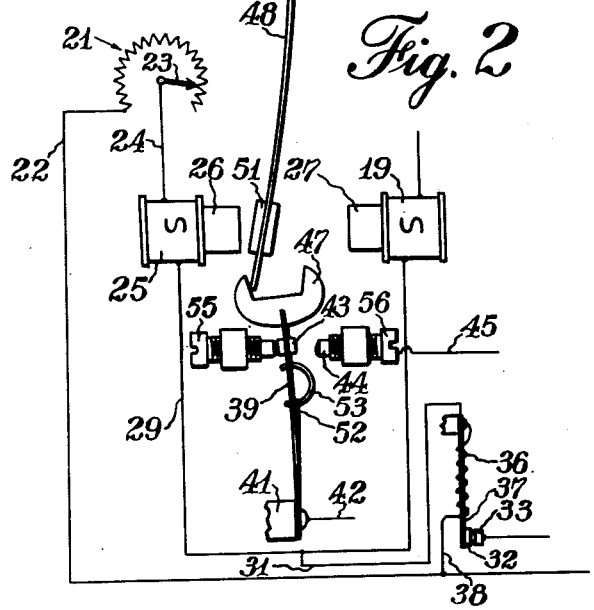
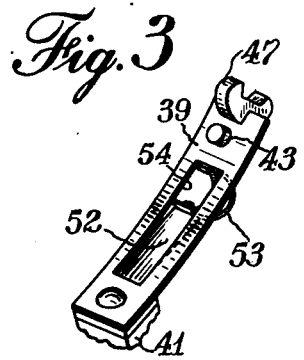
INVENTOR.
John W. Dickey
BY Clinton S. Janes
ATTORNEY May 8, 1951 J. W. DICKEY 2,552,480
ELECTRICAL HEATING SYSTEM
Filed Oct. 29, 1945 2 Sheets-Sheet 2
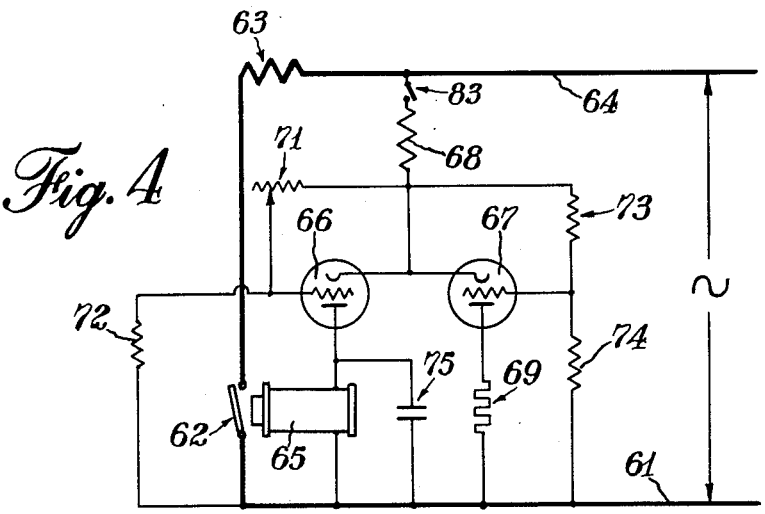
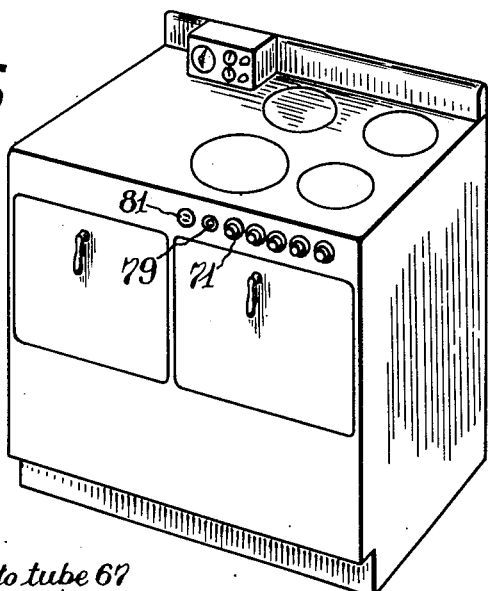
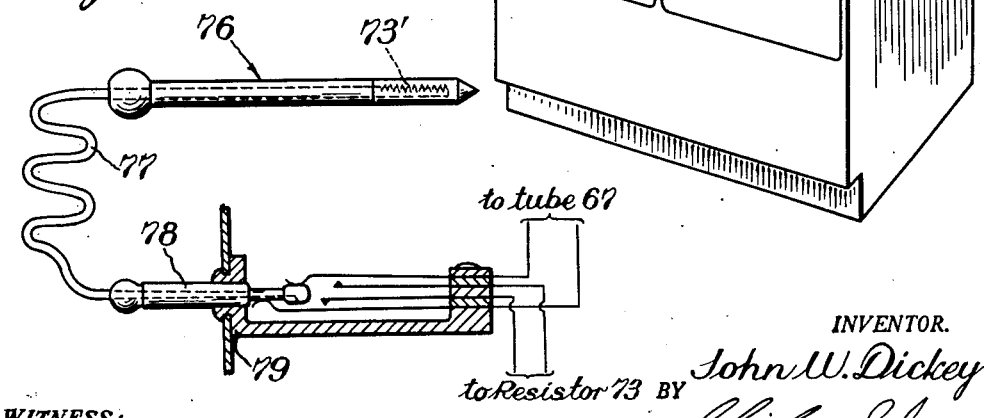
WITNESS:
Burr W. Jones
INVENTOR.
John W. Dickey
BY Clinton S. James
ATTORNEY Patented May 8, 1951

2,552,480

UNITED STATES PATENT OFFICE 2,552,480

ELECTRICAL HEATING SYSTEM

John W. Dickey, Elmira, N. Y., assignor to Bendix Aviation Corporation, Elmira Heights, N. Y., a corporation of Delaware Application October 29, 1945, Serial No. 625,329

4 Claims. (Cl. 219—20)

The present invention relates to an electrical heating system, and more particularly to a system for automatically controlling the heating units of cooking stoves.

In electrical stoves such as are now supplied for domestic use, the surface heating units are usually manually controlled, regulation being secured by incorporating a plurality of heating elements of different capacity in each unit, and using a hand switch for connecting one or more of the elements to the supply mains in accordance with the estimated heat requirements. Arrangements of this kind have the disadvantages that the temperature of the material in the utensil which is being heated must be measured or stimated by observation, fine regulation cannot be secured without utilizing a large number of heating elements and a complicated switching mechanism, and the temperature of the utensil may rise to a scorching or burning point upon evaporation of the contents while unattended.

It is an object of the present invention to provide a simple and inexpensive thermostatically controlled system for electric ranges permitting remote control setting of the desired temperature.

It is another object to provide such a system which will automatically and quickly secure and accurately maintain the desired temperature of the utensil to be heated.

It is another object to provide such a system which utilizes a heating unit having a single heating element, which means for automatically turning on and off said element at proper intervals to keep the utensil at a pre-set temperature.

It is a further object to provide such a device which is arranged to automatically turn on the heat when a utensil is placed on the heating unit, and to turn off the heat when the utensil is removed.

It is a further object of the invention to provide such a device in which the temperature-sensitive element may be in the form of a rod or probe which may be readily inserted in the material which is being cooked in order to control the application of heat in accordance with the internal temperature of the material.

Applicant's application Serial Number 189,098 filed October 9, 1950 is a division of the present application which is directed to the species of Fig. 4.

Further objects and advantages will be apparent from the following description taken in connection with the accompanying drawings, in which:

Fig. 1 is a semi-diagrammatic illustration of a preferred embodiment of the invention;

Fig. 2 is an enlarged detail of the control relay structure;

Fig. 3 is an enlarged detail in perspective of the spring toggle contact actuating means for the relay;

Fig. 4 is a diagrammatic representation of a system employing electronic control of the heating unit;

Fig. 5 is a perspective view of a domestic cooking range to which the present system has been applied; and Fig. 6 is an enlarged semi-diagrammatic detailed showing of a heat controlling element adapted to be plugged into a socket on the range so as to provide for control of one or more of the heating elements in accordance with the temperature of the material placed thereon into which the heat-sensitive element is inserted.

In Fig. 1 of the drawing, there is illustrated a heating unit 1 energized from supply mains 2 and 3 to heat a utensil 4 resting upon the heating unit. An electro-magnetic switch 5 is provided with contacts 6 interposed in the supply main 3, whereby energization of the switch coil 7 causes closure of the heating circuit and consequent energization of the heater 1.

According to the present invention, means are provided for so actuating the magnetic switch 5 as to maintain the utensil 4 at a predetermined temperature. As here shown, this is accomplished by means of a relay comprising a pair of opposed electro-magnets numbered 19 and 25 respectively, the energization of coil 19 being controlled in accordance with the temperature of the utensil, and the energization of coil 25 being controlled by a manually adjustable resistor. In this manner, variations in line voltage cannot affect the accuracy of the control.

The utensil-controlled circuit for electro-magnet 19 comprises a resistance unit 8 having a high temperature co-efficient mounted in a holder 9 having a supporting stem 11 slidably received in a bracket 12 located below the heater unit 1. The resistance unit is preferably located centrally with respect to the bottom of the utensil 4, and is pressed against the bottom of the utensil by a spring 13 so that the temperature of the resistance unit is substantially the same as that of the utensil. A switch member 14 located on the bottom of the stem 11 is arranged to be brought into engagement with contacts 15, 16 when the resistance unit is pressed down into the position shown in Fig. 1 by engagement with the utensil 4. Removal of the utensil permits opening of the switch 14, 15, 16 by the spring 13.

One end of the resistor 8 is connected by a lead 17 with the supply main 3, and the other end of the resistor is connected by a lead 18 to one end of the electro-magnet 19.

The circuit for controlling the electro-magnet 25 comprises a variable resistor 21 mounted preferably on the frame of the electric range in any convenient location for adjustment by the operator, and calibrated preferably in terms of a temperature scale. One end of the variable resistor is connected by a lead 22 to the supply main 3, and the movable tap 23 of the resistor is connected by a lead 24 to one end of the electro-magnet 25 which is arranged in juxtaposition to the electro-magnet 19, like poles 26 and 27 thereof facing each other at a suitable distance. The other ends of the electro-magnets 19, 25 are connected by leads 28, 29 to a common lead 31 by which they are joined to a thermostatically operated interrupter contact 32. The fixed contact 33 of the interrupter is connected by a lead 34 to the contact 15 of the utensil-operated switch, the contact 16 of which is connected by a lead 35 to the supply main 2. A heating coil 36 for the interrupter is connected at one end to the anchorage for a bi-metallic spring 37 which carries the contact 32, the opposite end of the heater being connected by a lead 38 to the lead 22 from the supply main 3.

The relay electro-magnets 19, 25 are arranged to control the energization of the electro-magnetic switch 5. For this purpose, a flat spring member 39 is anchored at one end at 41 and connected by a lead 42 to the lead 34 which is connected to the supply main 2 through the utensil-operated switch 14, 15, 16. On the upper portion of the spring strip 39, a contact 43 is mounted in position to engage a fixed contact 44 which is connected by a lead 45 to one end of the electro-magnetic switch coil 7, the opposite end of said coil being connected by lead 46 to the supply main 3. The upper end of the spring strip 39 is provided with a yoke 47, and a flat spring member 48 anchored at 49 is so arranged that its lower end extends within said yoke in a manner to engage and actuate the yoke to move the contact 43 into or out of engagement with the fixed contact 44. The spring strip 48 is located substantially midway between the opposing poles 26, 27 of relay electro-magnets 19, 25, and is provided with a soft iron armature 51 which is thus normally suspended midway between said electro-magnets.

Toggle means are preferably provided for causing the contacts 43, 44 to have a snap action and to maintain the contact 43 in the position to which it is moved by the spring actuator 48. For this purpose, a rigid arm 52 (Figs. 2 and 3) is anchored at one end to the support 41 of the contact spring 39, and is connected at its other end to said spring through an elastic compression member 53, the contact spring 39 being provided with an opening 54 receiving said arm and compression member. Adjustable stops 55 and 56 (Fig. 2) are preferably provided for regulating the throw of the contact spring, the stop 55 also providing the mount for the fixed contact 44. Adjustable thrust members 57 and 58 are also provided for centering the armature 51 between the relay electro-magnets 19, 25.

The interrupter heating coil 36 may, if desired, be provided with an insulating sheath 59 which slows down the cooling rate of this heater and thus reduces the frequency of operation of the interrupter.

In operation, when it is desired to heat a utensil it is placed upon the heating unit as indicated in Fig. 1, and regulator 21 is adjusted to the temperature at which it is desired to maintain the utensil 4. Placing the utensil on the heating unit automatically closes the switch 14, 15, 16, thereby connecting contact 33 of the interrupter and contact 43 of the relay to the supply main 2. Since the interrupter is initially at room temperature, contacts 32, 33 are closed, and the relay electro-magnets 19, 25 are energized to a degree depending on the value of their respective resistors 8 and 21. These electro-magnets oppose each other in their action on the armature 51, and since at this time the utensil-controlled resistor 8 is at room temperature so that its resistance is low, the electro-magnet 19 is strongly energized, and the armature 51 is moved to the right so as to close the relay contacts 43, 44 if they have not already been left in a closed condition from previous operation of the device. Coil 7 of electro-magnetic switch 5 is accordingly energized to close the heating circuit through the contacts 6, and the heating unit is energized from the supply mains.

The heating coil 36 of the interrupter is also energized at this time and acts to break the relay circuits by opening contacts 32, 33 after a short time interval. Both the relay electro-magnets 19, 25 are thus deenergized and the armature 51 returns to its middle position, but the relay contacts 43, 44 remain closed due to the lost motion between the yoke 47 and the armature spring 48.

After a second suitable time interval, the bi-metallic strip 37 cools off and permits the interrupter contacts to reclose. The operation of the relay is then repeated periodically, the circuit to the heating unit 1 remaining closed. As the temperature of the utensil 4 rises, the resistance of the element 8 increases until the utensil has reached the desired temperature. The value of the resistor 8 is then exactly equal to the setting of the variable resistor 21 whereby the electro-magnets 19, 25 are equally energized. When the temperature of the utensil 4 rises above this point, the resistance 8 becomes greater than the setting of the resistor 21, electro-magnet 25 thereupon overbalances the electro-magnet 19 and the armature 51 is drawn to the left in Fig. 1, thus opening the relay contacts 43, 44 as shown in Fig. 2. Switch coil 7 is accordingly deenergized and the circuit of the heating unit 1 is opened until the temperature of the utensil falls below the desired point at which time the relay contacts 43, 44 are reclosed by the preponderating effect of the electro-magnet 19, and the application of heat to the utensil is resumed.

Inasmuch as the heat-sensitive element 8 is located within the heating element 1, a certain amount of heat will be transmitted directly from the heating element to the heat-sensitive resistor 8. This provides an anticipatory effect in the control which is beneficial in preventing wide fluctuation of temperature before settling down to the desired temperature. It is also useful in connection with the heating of utensils containing water since it prevents the possibility of the water in a container being boiled off rapidly if the thermostat is set somewhat above the boiling point of the liquid. In order to control this anticipatory effect and prevent the transmission of too much heat directly to the control element 8, this element is provided with a ring of insulation as indicated at 60.

It will be noted that the system so far described will operate equally well on either alternating current or direct current provided that the electro-magnets 19, 25 and the switch coil 7 are properly designed.

In Fig. 4 of the drawing, there is illustrated an embodiment of the invention in which the control of the heating switch is obtained electronically without mechanical moving parts. As there shown, a supply main 61 is connected through an electro-magnetic heating switch 62 to one end of a heater element 63, the opposite end of which is connected to the other supply main 64. A bridge circuit is provided for controlling the coil 65 of the heating switch 62 in an analogous manner to the control system of the first embodiment. For this purpose, a pair of gas-filled triodes 66 and 67 have their cathodes connected in parallel to the supply main 64 through a dropping resistor 68. The plate of the triode 66 is connected to one terminal of the coil 65, the other terminal of which is connected to the supply lead 61 so that the triode 66 controls the energization of said coil from the supply mains. The plate of the triode 67 is connected to the supply main 61, preferably athough not necessarily through a non-inductive resistor 69.

The grid of the triode 66 is connected to its cathode by a manually variable resistor 71 which is calibrated in terms of temperature as in the first embodiment. The grid is also connected to the supply main 61 through a bleeder resistor 72. In like manner, the grid of the triode 67 is connected to its cathode through a resistor 73 having a high temperature coefficient which is located in the position the temperature of which it is desired to control. The grid of the triode 67 is also connected to the supply main 61 through a bleeder resistor 74.

This circuit arrangement constitutes a bridge circuit or neetwork having balanced arms in which are located the variable resistors 71, 73 and the bleeder resistors 72, 74 whereby the instantaneous bias of the grids of the triodes 66 and 67 depends upon the voltage drop across the variable resistors 71, 73 respectively.

Inasmuch as the mains 61, 64 are supplying alternating current at, for instance, 60 cycles, the grids of the triodes swing positive and negative with respect to their cathodes during each oscillation of the supply current, but the amplitude of the swing of said grids is controlled by the variable resistors so that when the resistor 71 has a higher resistance than the resistor 73, the grid of triode 66 has a greater bias than the grid of the triode 67 so that triode 66 becomes conductive during the positive swing of its grid before the grid of the tube 67. Inasmuch as the triodes are of the gas-filled type, as soon as either tube becomes conductive, the resistance thereof drops to a low value so as to practically short-circuit the other tube, whereby the entire flow of current through the bridge network occurs through the one tube, the other remaining non-conductive. This sets up a pulsating rectified plate current flow through the conductive tube, and in the case of the tube 66, this plate current energizes the switch coil 65 to cause closure of heating switch 62. In case the tube 67 is the first to become conductive, its plate current is dissipated through resistor 69. A condenser 75 is preferably shunted around the switch coil 65 in order to smooth out the impulses of the plate current supplied by the tube 66 to the switch coil 65 and also to provide a non-inductive path for the initial flow of plate current, whereby the voltage drop through the circuit of the conductive tube immediately is reduced to a low value, thus precluding the possibility of the other tube being rendered conductive.

The resistor 73 is located in any position, the temperature of which it is desired to control. This may be in contact with a utensil to be heated as in the first embodiment, or the resistor may be located in a probe or rod as illustrated at 76 in Fig. 6, and connected by a flexible cord 77 to a plug 78 which may be plugged into a jack or socket 79 located on the stove as shown in Fig. 5. The jack is arranged as indicated diagrammatically in Fig. 6 so that the insertion of the plug 78 disconnects the heat control resistor from any desired one of the heating elements, and connects the resistor element 76 in place thereof. Added flexibility of control may be obtained by connecting a convenience socket 81 in parallel with the control circuit of this particular heater element whereby any extraneous heating device may be controlled by the resistor element 76, using for this purpose the manual control resistor 71 of the heating element in question.

In the operation of this embodiment of the invention, closure of a switch 83 in the bridge circuit connects the control system to the current supply. This may be accomplished manually or by means of a utensil-controlled switch as illustrated in Fig. 1. The resistor 71 is then adjusted to the desired indicated temperature, and since the resistor 73 is initially at a low temperature, the resistance thereof is less than that of the resistor 71. The oscillations of the supply current thus cause the grid of the triode 66 to swing further than the grid of the triode 67, whereby tube 66 becomes conductive first, and a pulsating direct current is supplied to the switch coil 65 causing closure of the heat control switch 62 and energization of the heater element 63. When the article to be heated has attained the desired temperature, the control resistor 73, which is in contact therewith, reaches a value equal to that of the manually adjusted resistor 71. Any rise in temperature beyond this value causes the voltage drop through the resistor 73 to be greater than that through the manual resistor 71 whereby the tube 67 becomes conductive before the tube 66. The flow of plate current through the tube 66 is thus cut off, allowing the heat control switch 62 to open.

It will be noted that since alternating current is used in this embodiment of the invention, there is no need of a thermostatic interrupter such as illustrated in the first embodiment.

Although but two embodiments of the invention are shown and described in detail, it will be understood that other embodiments are possible and various changes may be made in the form and arrangement of the parts without departing from the spirit of the invention as defined in the claims appended hereto.

What is claimed is:

1. In an electrical system for heating a utensil, a heating element, a balanced relay for controlling energization of the element including a relay closing coil, an opposing coil, and an armature normally centralized therebetween; means for controlling the energization of the relay closing coil including a resistor of material having a high temperature co-efficient, said resistor being thermally connected to the utensil so as to be maintained substantially at the temperature of the utensil, means including a manually operable variable resistor for controlling the energization of the opposing coil, and means continuously operative at predetermined time intervals to simultaneously deenergize both said coils so as to allow said armature to centralize itself therebetween, and then to simultaneously energize both said coils to cause the armature to move toward that coil which is more strongly energized.

2. In an electric stove, a heater element, a circuit including an electromagnetic switch for energizing said element, and means for controlling said switch to maintain the object to be heated at a predetermined temperature including a control circuit having two parallel branches, energization of one of which causes force to be applied to the switch in the direction to close the switch, while energization of the other branch opposes such closure, means whereby effective energization of one branch of the control circuit prevents the other branch from performing its function, means continuously operative at predetermined time intervals to energize and deenergize said control circuit, thereby applying pulsations of voltage simultaneously to both said branches; and means including means responsive to the temperature of the object to be heated for accelerating the energization of the switch closing branch of the control circuit when the temperature of said object is below that desired, and accelerating the energization of the opposing branch when the temperature of said object is above the desired temperature.

3. In a control system for an electric stove, a heater element, means including a magnetic switch for actuating the heater element, means for controlling the magnetic switch including an electrical circuit having two parallel branches, means whereby effective energization of one branch of the control circuit causes closure of the magnetic switch and holds the switch closed as long as the control circuit is energized, means whereby prior effective energization of the other branch of the control circuit prevents such closure, means continuously operative at predetermined time intervals, to open and close the control circuit to thereby simultaneously connect both branches thereof to a source of power, means including heat responsive means located in thermally conductive relation with the article to be heated, for controlling the energization of the switch closing branch of the control circuit, and manually adjustable means for controlling the energization of the other branch of the control circuit.

4. In an electrical system for heating a utensil, a heating element, means for controlling the heating element including a relay having a switch closing coil, an opposing coil and an armature normally centered between said coils when the coils are deenergized; means for varying the energization of one of said coils in response to variation in temperature of said utensil, manually operable means for varying the energization of the other said coil, and means operative to simultaneously energize and deenergize said coils at predetermined time intervals.

JOHN W. DICKEY.

REFERENCES CITED

The following references are of record in the file of this patent:

UNITED STATES PATENTS

| Number | Name | Date |
|---|---|---|
| 510,003 | Delany | Dec. 5, 1893 |
| 915,974 | Leonard | Mar. 23, 1909 |
| 1,183,814 | Haagn | May 16, 1916 |
| 1,196,175 | Templeton et al. | Aug. 29, 1916 |
| 1,276,389 | Steinmetz | Aug. 20, 1918 |
| 1,550,155 | Fitzgerald | Aug. 18, 1925 |
| 1,776,901 | Essex et al. | Sept. 30, 1930 |
| 2,086,966 | Shrader | July 13, 1937 |
| 2,103,513 | Campbell | Dec. 28, 1937 |
| 2,254,039 | Kavalsky | Aug. 26, 1941 |
| 2,303,012 | Weber | Nov. 24, 1942 |
| 2,311,118 | Matthews et al. | Feb. 16, 1943 |

FOREIGN PATENTS

| Number | Country | Date |
|---|---|---|
| 353,297 | Germany | May 13, 1922 |
| 372,654 | Great Britain | May 12, 1932 |
| 455,426 | Germany | Feb. 3, 1928 |